United States Patent Office 3,463,478
Patented Aug. 26, 1969

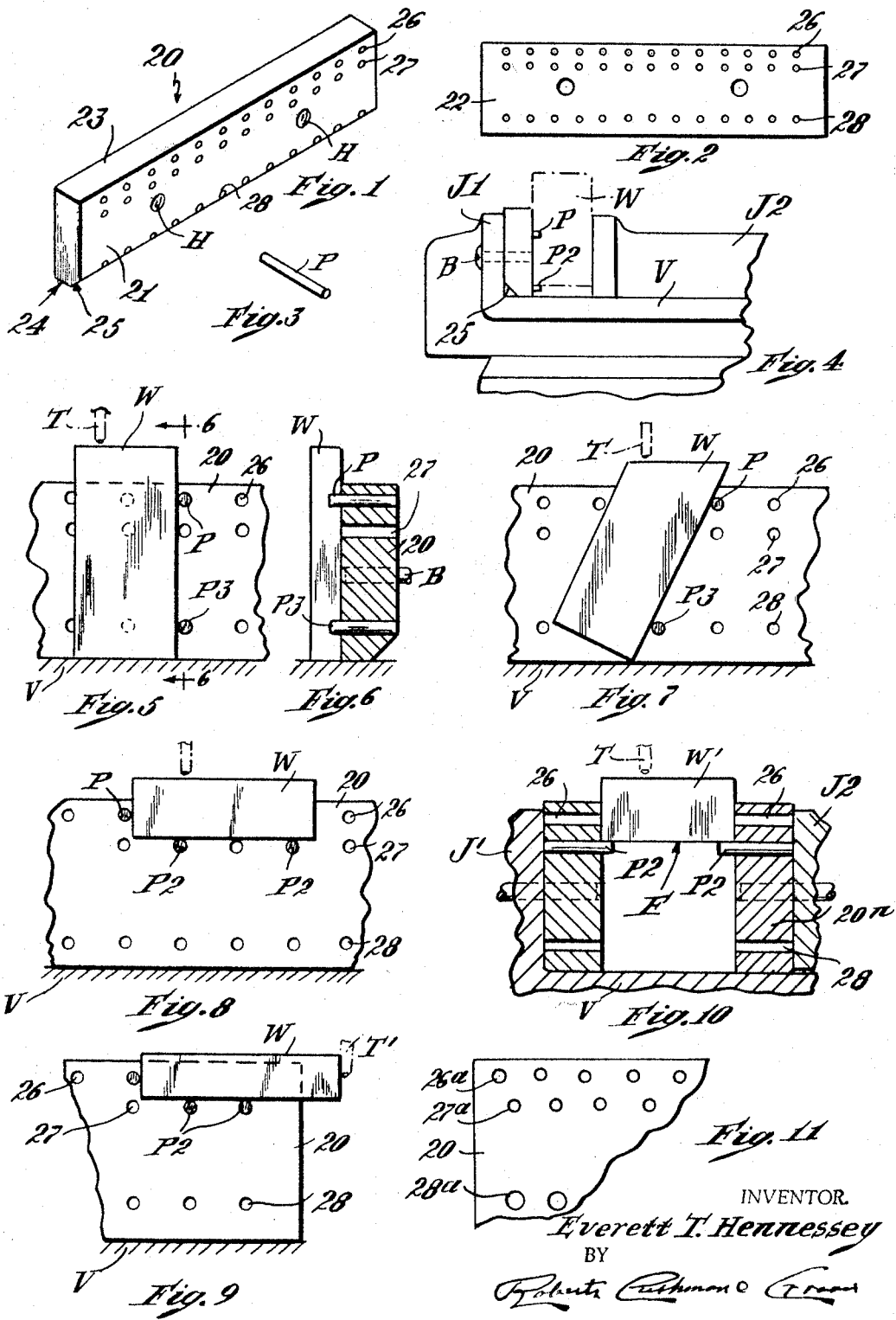

3,463,478
WORKPIECE POSITIONING DEVICE FOR MACHINE TOOLS
Everett T. Hennessey, Waltham, Mass., assignor to Zip Products, Inc., Waltham, Mass., a corporation of Massachusetts
Filed Nov. 3, 1964, Ser. No. 408,518
Int. Cl. B25b 1/24; B23q 17/18
U.S. Cl. 269—271                                    9 Claims This invention relates to apparatus for accurately and rigidly supporting a workpiece in selected position with reference to an operating tool while the workpiece is undergoing a machining operation, and particularly to a device of simple and inexpensive design operative to provide a cradle or support for positioning the workpiece in accurate relation to the operating tool while the workpiece is firmly held between relatively movable jaws, for example the jaws of a machine tool vise.

According to one customary procedure, the machine operator has positioned the workpiece relatively to the field of operation of the tool by the use of micrometer gauges or other measuring instruments, but when a plurality of identical workpieces are to undergo the same operation, much time is wasted in thus setting up each individual piece in readiness for machining. In mass production jobs, jigs and fixtures are commonly employed, but these devices are expensive and when only a small number of like parts is to be machined, the cost of making such jigs may be prohibitive, and when a machine shop is required repeatedly to prepare a substantial number of like parts but only at infrequent intervals, the capital invested in jigs which are only in use for relatively short periods of time presents a serious problem.

The present invention has for its principal object the provision of a work-positioning device having provision whereby the same operation may be performed upon a plurality of workpieces, after the first one has been properly set up, without further adjustment of the work-positioning device, but wherein the work-positioning device is so constructed that it may be readjusted without necessitating the employment of gauges or other tools and within a period of a few minutes time, for the reception of a workpiece of different character, or preparatory for a different operation to be performed upon the same workpiece which has already undergone one machining operation.

Another object of the invention is to provide work-positioning means for supporting workpieces of different dimensions and in a variety of positions for the performance of precision machining operations; the provision of improved work-positioning means such as to minimize the skill required and errors in work set up; the provision of an improved work-positioning means which is equally adaptable for short and long run production work; and the provision of work-positioning means which eliminates the need of skill on the part of the workman in the making of precise measurements as well as the requirement for tools of precision in setting up the work.

Other objects and advantages of the invention will be pointed out in the following more detailed description and by reference to the accompanying drawings wherein:

FIG. 1 is a perspective view illustrating a work-positioning block according to the present invention;

FIG. 2 is a rear elevation of the block shown in FIG. 1;

FIG. 3 is a perspective view of a work-positioning pin constituting a part of the work-positioning device of the invention;

FIG. 4 is a fragmentary side elevation of a machine-tool vise showing a workpiece positioned between the vise jaws by the use of the block of the present invention;

FIG. 5 is a fragmentary front elevation showing a work-positioning block resting upon the base member of a vise and held in upright position by the device of the present invention;

FIG. 6 is a vertical section on the line 6—6 of FIG. 5;

FIGS. 7, 8 and 9 are fragmentary elevations, in each instance showing in section a portion of the base member of a machine-tool vise, with a workpiece held in operative relation to a tool by the work-positioning device of the present invention;

FIG. 10 is a fragmentary vertical section showing a workpiece disposed between two vise jaws and positioned by means of two coacting work-positioning blocks according to the present invention; and FIG. 11 is a view similar to FIG. 2, but illustrative of a modified arrangement of pin-receiving holes.

Referring to FIGS. 1 and 2, the numeral 20 designates a work-positioning block illustrative of a device according to the invention—this block, as shown, being substantially rectangular and having parallel front and rear vertical faces 21 and 22 respectively, and a substantially horizontal top face 23 and a bottom face 24—the lower rear edge of the block being beveled as shown at 25. The block is provided with a plurality of holes H, two such holes being here shown, extending through the block from front to rear and here shown as screw-threaded, these holes being designed for the reception of bolts B (FIGS. 6 and 10), whereby the block may be fixedly secured to one of the jaws J¹ (FIG. 4) of a vise, for example of the customary type employed for holding workpieces in operative position in a machine tool.

As illustrated in FIGS. 1 and 2, the block 20 is provided with two parallel rows of holes 26, 27 respectively, desirably extending completely through the block from its front face to its rear face—these holes being designed for the reception of removable work-positioning pins P (FIG. 3). The pins and the holes for their reception are machined to relatively close tolerances so that the pins, although fitting snugly in place, may still be removed easily. These pins are of a length exceeding the thickness of the block 20, but less than the combined thickness of the block and workpiece which is to be machined.

As shown in FIGS. 1 and 2, the block is provided with another row of similar holes 28 near its lower edge. As shown in FIGS. 1 and 2 the holes 26, 27 constituting the two upper rows are arranged one directly above another, but it is contemplated that the holes in the two rows may be staggered relatively to each other, as illustrated, for example, at 26, 27a in block 20a (FIG. 11). Obviously the holes may be spaced apart variously according to the class of work which may be expected and since the device is of so simple a character, it is a practical matter to provide a substantial number of these blocks having holes differently arranged or of different sizes (see FIG. 11) without involving undue expense or requiring excessive storage space.

In FIG. 4 the block 20, according to the present invention, is shown as positioned between the jaws J¹ and J² and with its bottom face resting upon the base V of the vise. As will be noted, the beveled edge 25 of the block 20 is arranged at the intersection between the vertical face of the jaw J¹ and the horizontal surface of the base member V. The bevel provided at this point on the block avoids any difficulties which might be encountered by reason of the accumulation of foreign material in the angle between the vertical face of the jaw and the horizontal face of the part V or failure of the jaw and the base to intersect at a sharp corner.

As shown, one of the pins P projecting from an upper row of holes in the block 20 engage one end face of the workpiece 27, while other pins, one of which is shown at P², arranged in the lower row of holes, underlie the lower face of the workpiece so as to support the workpiece in desired elevated position between the jaws J¹ and J².

In FIGS. 5 and 6 a workpiece W is shown with its lower face in contact with the upper horizontal surface of the vise base V and with its right-hand face contacting pins P and P³ projecting from the block 20—it being understood that the workpiece and block will be clamped between the jaws of the vise so that the workpiece is now held accurately in position for machining by the tool T, for example a drill.

In FIG. 7 the workpiece W is shown as disposed with its lowermost corner resting upon the upper surface of the base V of the vise and with its right-hand edge disposed in inclined position while supported by the pin P in a hole 26 of the upper row and a pin P³ in a hole 28 of the lower row, the holes being so chosen that the pins P and P³ are operative to hold the block in the desired angular position while it is being machined by the tool T.

In FIG. 8 the workpiece W is shown as having its lower edge supported solely by pins P² arranged in holes 27 of the lower of the two upper rows of holes and having one of its ends contacting a pin P disposed in a hole 26 of the uppermost row. As thus positioned, the workpiece would be clamped between the jaws of the vise—it being recalled, at this point, that because the pins are of a length less than the combined thickness of the workpiece and block, the presence of the block between the vise jaws does not interfere with their proper closing. The workpiece W is thus held rigidly in position and at the desired elevation for operation by the tool T.

In FIG. 9 the workpiece W is shown as resting upon pins P² in holes 27 of the lower of the two upper rows of holes and as having one end engaging a pin placed in a hole 26 of the uppermost row. As thus positioned, the right-hand end, as shown in FIG. 9, of the workpiece W projects outwardly beyond the block 20 and as thus positioned its end surface is exposed for treatment by a tool T¹ which may be a milling cutter, grinding wheel, or the like.

In FIG. 10 a further possible arrangement is illustrated wherein the lower face F of workpiece W rests on pins P² located in holes (not shown) of the lower of the upper rows of holes in two separate blocks 20m and 20n, both of which are interposed between the jaws J¹ and J² of the vise with the workpiece W¹ between them. With this arrangement it is possible to support a workpiece which is relatively thin vertically and in convenient position to be operated upon by the tool T, although the blocks 20m and 20n may be of substantial vertical depth.

While the device of the present invention may thus be employed for variously positioning a workpiece as illustrated, it is to be understood that the illustrations are merely by way of example and that workpieces of various sizes and shapes may be arranged accurately in predetermined positions such as may be determined by the insertion of pins in suitably selected holes in the block and so that a selected face of the workpiece may be presented to a tool.

While certain desirable embodiments of the invention have herein been illustrated and described by way of example, it is to be understood that the invention is broadly inclusive of any and all modifications falling within the scope of the appended claims.

I claim:

1. In combination with a machine tool comprising relatively movable jaws for holding a workpiece for machining, means for supporting the workpiece in a predetermined position between the jaws comprising a block designed to be disposed between said jaws and having a plurality of holes formed therein in a predetermined pattern, and pins to be inserted in selected holes of said block to retain the workpiece in predetermined angular position, the pins being of a length exceeding the thickness of the block but less than the combined thickness of the block and workpiece.

2. The combination according to claim 1, wherein the block is provided with holes for the reception of fastening means for securing it to one of the jaws of a machine-tool vise.

3. The combination according to claim 1, wherein the positioning pins and positioning holes are machined to close tolerances for snug but removable fitting.

4. The combination according to claim 1, wherein the block is substantially rectangular and at least one longitudinal edge of the block is beveled.

5. The combination according to claim 1, wherein an independent positioning block is secured to each respective jaw.

6. A work-positioning block for positioning a workpiece between the jaws of a vise while said workpiece is being machined, said block being of hard steel of substantially uniform thickness and having a plurality of holes extending through it from one face to the opposite face, said holes being arranged in a predetermined pattern, and, in combination with said block, pins of such diameter as to fit with sliding tolerance in such selected holes in the block as to position a workpiece between the jaws of a vise for the performance of a predetermined machining operation, the pins being of a length exceeding the thickness of the block but less than the combined thickness of the block and workpiece.

7. A work-positioning block according to claim 6, wherein pin-receiving holes are arranged in parallel rows, one at least of said rows being located adjacent to the upper face of the block, and another row, at least, being located near the lower face of the block.

8. A work-positioning block according to claim 6, wherein pin-receiving holes are arranged in parallel rows, with holes in one row staggered relatively to holes in another row.

9. In combination with a machine tool comprising relatively movable jaws for holding a workpiece for machining, means for supporting the workpiece in a predetermined position between the jaws comprising a block designed to be disposed between the jaws and having a plurality of holes formed therein in a predetermined pattern, and pins to be inserted in selected holes of said blocks to retain the workpiece in a predetermined angular position, the pins being of a length exceeding the thickness of the block.

References Cited

UNITED STATES PATENTS

| 2,195,277 | 3/1940 | Kleiman | 269—296 X |
| 2,366,385 | 1/1945 | Comfort | 33—174 |
| 2,401,054 | 5/1946 | Daley | 33—174 |

ROBERT C. RIORDON, Primary Examiner

J. F. McKEOWN, Assistant Examiner

U.S. Cl. X.R.

33—174